United States Patent
Klees et al.

(10) Patent No.: US 7,592,946 B2
(45) Date of Patent: Sep. 22, 2009

(54) LEVEL MEASUREMENT ARRANGEMENT

(75) Inventors: Dan Klees, Greenwood, IN (US); Rob Vermeulen, Greenwood, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/339,664

(22) Filed: Jan. 26, 2006

(65) Prior Publication Data

US 2006/0181450 A1 Aug. 17, 2006

Related U.S. Application Data (60) Provisional application No. 60/652,008, filed on Feb. 14, 2005.

(51) Int. Cl.
G01F 23/00 (2006.01)
G01S 13/08 (2006.01)
G01S 13/00 (2006.01)

(52) U.S. Cl. ............... 342/124; 342/118; 342/175; 342/195; 73/290 R; 73/304 R; 324/600; 324/629; 324/637; 324/642; 324/644

(58) Field of Classification Search ............... 342/118, 342/124, 175, 195; 73/290 R, 304 R, 304 C, 73/866.5; 324/600, 629, 637–646
See application file for complete search history.

(56) References Cited

U.S. PATENT DOCUMENTS

| | | | | |
|---|---|---|---|---|
| 3,626,284 A | * | 12/1971 | Bak ................... | 324/642 |
| 3,853,005 A | * | 12/1974 | Schendel ............ | 73/290 R |
| 3,995,212 A | * | 11/1976 | Ross .................. | 324/642 |
| 4,489,601 A | * | 12/1984 | Rao et al. .......... | 73/290 R |
| 4,807,471 A | * | 2/1989 | Cournane et al. .. | 73/290 R |
| 5,249,463 A | * | 10/1993 | Willson et al. .... | 73/290 R |
| 5,717,337 A | * | 2/1998 | Kelly ................. | 73/290 R |
| 5,781,019 A | * | 7/1998 | Telder ................ | 324/643 |
| 5,898,308 A | * | 4/1999 | Champion ......... | 324/643 |
| 5,973,637 A | * | 10/1999 | Perdue et al. ..... | 342/124 |
| 6,054,946 A | * | 4/2000 | Lalla et al. ........ | 342/124 |

(Continued)

OTHER PUBLICATIONS

"I/A Series Pressure Transmitters"; Publication MI IAP10-A/IGP10-A; Feb. 2006; Invensys Systems, Inc.; Foxboro, Massachusetts, USA; no author listed.*

(Continued)

*Primary Examiner*—Bernarr E Gregory
(74) *Attorney, Agent, or Firm*—Bacon & Thomas, PLLC (57) ABSTRACT

A level measurement arrangement for measurement of a level of a product in a container, comprising: a level sensor, having: a mounting element, including a process connector, for mounting the mounting element on a mating counter connector on an opening of the container, and a conductive probe segment extending from the mounting element into the container; a conductive probe extension (19), having a first end, which is permanently fixed to an inner wall of the container, and having a second end, which is detachably connectable to an end of the conductive probe segment extending into the container; and sensor electronics comprising elements for generating and sending short electromagnetic pulses down the probe segment and the probe extension, elements for reception of the echoes of the pulses reflected at a surface of the product elements for determining the level of the product in the container, based on a time of flight needed for a pulse to travel down the probe segment and the probe extension, and its echo to return.

9 Claims, 6 Drawing Sheets

U.S. PATENT DOCUMENTS

| | | | |
|---|---|---|---|
| 6,078,280 A * | 6/2000 | Perdue et al. | 342/124 |
| 6,121,780 A * | 9/2000 | Cruickshank et al. | 324/643 |
| 6,229,476 B1 * | 5/2001 | Lutke et al. | 342/124 |
| 6,292,131 B1 * | 9/2001 | Wilke et al. | 342/124 |
| 6,337,655 B1 * | 1/2002 | Wilkie et al. | 342/124 |
| 6,445,192 B1 * | 9/2002 | Lovegren et al. | 324/644 |
| 6,504,793 B2 * | 1/2003 | Fuenfgeld | 342/124 |
| 6,538,598 B1 * | 3/2003 | Wilkie et al. | 342/124 |
| 6,559,657 B1 * | 5/2003 | McCarthy et al. | 324/642 |
| 6,681,626 B2 * | 1/2004 | Funfgeld | 342/124 |
| 6,701,783 B2 * | 3/2004 | Fehrenbach et al. | 324/644 |
| 6,928,867 B2 * | 8/2005 | Reimelt et al. | 342/124 |
| 7,012,437 B2 * | 3/2006 | Klofer | 324/642 |
| 2002/0154052 A1 * | 10/2002 | Fehrenbach et al. | 342/124 |
| 2003/0169197 A1 * | 9/2003 | McGregor | 342/124 |
| 2004/0011126 A1 * | 1/2004 | Otto et al. | 73/290 R |
| 2004/0025588 A1 * | 2/2004 | Schroth et al. | 73/304 C |
| 2004/0154392 A1 * | 8/2004 | Reimelt et al. | 73/290 R |

OTHER PUBLICATIONS

"FiberView Transition Sensor"; Document 1002; Jan. 2005; Reflectronics, Inc.; Lexington, Kentucky, USA; no author listed.*

* cited by examiner

LEVEL MEASUREMENT ARRANGEMENT

TECHNICAL FIELD

The present invention relates to a level measurement arrangement for measurement of a level of a product in a container.

BACKGROUND DISCUSSION

Level measurement forms a central part in many industrial applications. Level measurement data is for example used for industrial process control and/or automation. Various level measurement devices are presently available on the market.

Some devices use mechanical floats or displacers mounted on a cable or rod inside the container. The position of these floats is used to determine the level of the liquid. Magnetostrictive, resistance or cable tension sensing technologies are used to determine the position of the float. Mechanical floats and displacers often require significant maintenance and are subject to material buildup errors. They often require physical entry into a container in order to clean and/or repair the device.

In many branches of industry high standards of hygiene, cleanliness and cleanability are required. Standardized cleaning and sterilization methods are applied to fulfill these requirements. Widely used methods are Cleaning in Place (CIP) or Sterilization in Place (SIP). Cleaning and/or sterilization can be carried out with automated or manual systems via various procedures on the site in a reliable and repeatable process that meets the stringent hygiene regulations demanded by biotechnology and pharmaceutical industries. Some systems include spray balls which can be permanently installed inside containers to apply liquid cleaners, water, detergents, steam or other cleaning or sterilization agents into closed containers. This has the advantage that containers do not need to be opened and exposed to the environment for cleaning and/or sterilization purposes.

There is a great reluctance to use mechanical floats, because they cannot be easily cleaned using these method.

Time of flight radar techniques have been used to determine the position of the surface of a product in a container. Corresponding level measurement devices comprise a conductive probe that extends into the container. The probe is connected to sensor electronics comprising means for generating and sending short electromagnetic pulses down the probe and means for reception of echoes of the pulses reflected at a surface of the product. The level of the product is determined based on a measurement of a time of flight needed for a pulse to travel down the probe and its echo to return. Such devices are for example the Guided Radar Transmitters Levelflex FMP 40, sold by the applicant.

In order to measure levels near the bottom of the container, the probe preferably extends far down into the container, leaving only a small gap between the tip of the probe and the adjacent container wall. When spray balls are applied, it is possible, that a bottom side of the probe facing away from the spray ball cannot always be successfully cleaned and/or sterilized by spray balls, thus allowing deposits to build up in this area.

In existing devices the probe is an integral part of the device and is for example welded or threaded to a process connection for mounting the device on the container. In order to clean and/or sterilize the tip of the probe, the entire device may have to be taken out of the container, thus leaving an opening in the container, through which the interior of the container is exposed to the environment. In addition it might be necessary during maintenance of the device, to take the device out of the container. This is not acceptable in many biotechnological or pharmaceutical applications.

SUMMARY OF THE INVENTION

It is an object of the invention to provide a level measurement arrangement for measurement of a level of a product in a container that can be used in applications, where high standards of hygiene, cleanliness and cleanability are required.

To this end the invention comprises a level measurement arrangement for measurement of a level of a product in a container, comprising:
- a level sensor, comprising:
    - a mounting element, comprising:
        - a process connector, for mounting the mounting element on a mating counter connector on an opening of the container, and
        - a conductive probe segment extending from the mounting element into the container,
- a conductive probe extension,
    - having a first end, which is permanently fixed to an inner wall of the container, and
    - having a second end, which is detachably connectable to an end of the conductive probe segment extending into the container, and
- sensor electronics comprising:
    - means for generating and sending short electromagnetic pulses down the probe segment and the probe extension,
    - means for reception of echoes of the pulses reflected at a surface of the product,
    - means for determining the level of the product in the container, based on a time of flight needed for a pulse to travel down the probe segment and the probe extension and its echo to return.

According to a preferred embodiment, the sensor electronic is divided into a primary sensor electronic comprising the means for generating and sending short electromagnetic pulses down the probe segment and the probe extension and the means for reception of echoes of the pulses reflected at a surface of the product and a secondary sensor electronic comprising the means for determining the level of the product in the container.

According to a preferred embodiment, the primary sensor electronic is located inside the mounting element, and the secondary sensor electronic is located inside a housing.

According to a preferred embodiment, the arrangement comprises:
- means for detachably mounting the housing on the mounting element outside the container, and
- means for detachably connecting the primary sensor electronic, located in the mounting element to the secondary sensor electronic, which is located inside the housing.

According to a preferred embodiment, the probe extension is welded onto the wall of the container, and all surfaces of the weld are polished.

According to a preferred embodiment, the process connector of the mounting element is a tri-clamp connector.

According to a preferred embodiment, a detachable connection between the conductive probe extension and the conductive probe segment comprises a bayonet fitting, a threaded joint or an in-line plug connector.

According to a preferred embodiment, the detachable connection between the probe segment and the probe extension is located above the product in the container.

It is an advantage of the arrangement according to the invention, that all parts of the arrangement inside the container can be cleaned and/or sterilized in place without opening the container. Spray balls can be used for cleaning and/or sterilization.

Also the secondary electronics can be maintenanced, serviced and/or replaced without removing the mounting element from the container.

An additional advantage is that the probe extension extends to the bottom of the container. Thus level measurements can be performed throughout the entire height of the container.

The invention and its advantages are explained in more detail using the figures of the drawing, in which one exemplary embodiment is shown. The same reference numerals refer to the same elements throughout the figures.

DETAILED DESCRIPTION OF THE DRAWINGS

Figure 1:
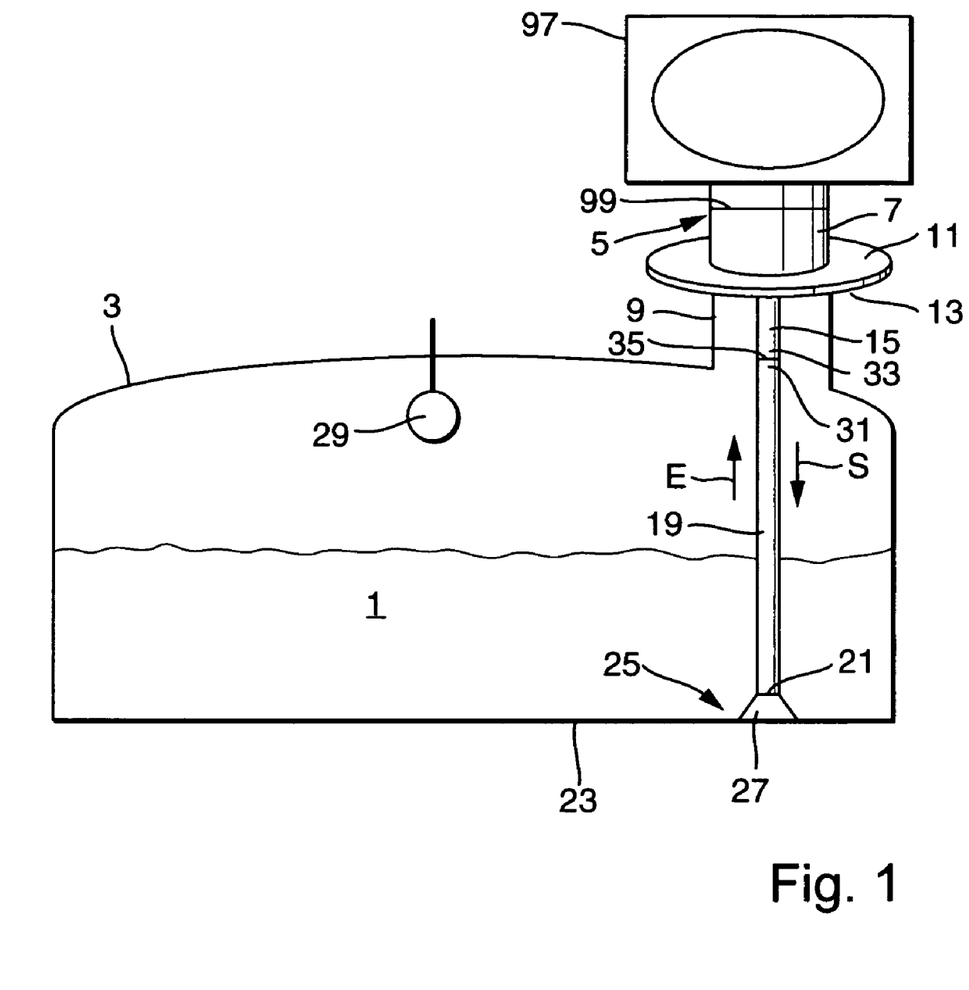
FIG. 1 shows a schematic diagram of a level measurement arrangement according to the invention.

FIG. 1 shows a schematic diagram of a level measurement arrangement for measurement of a level of a product 1 in a container 3. The container 3 can be any type of vessel or tank used in industry.

Figures 2, 3:
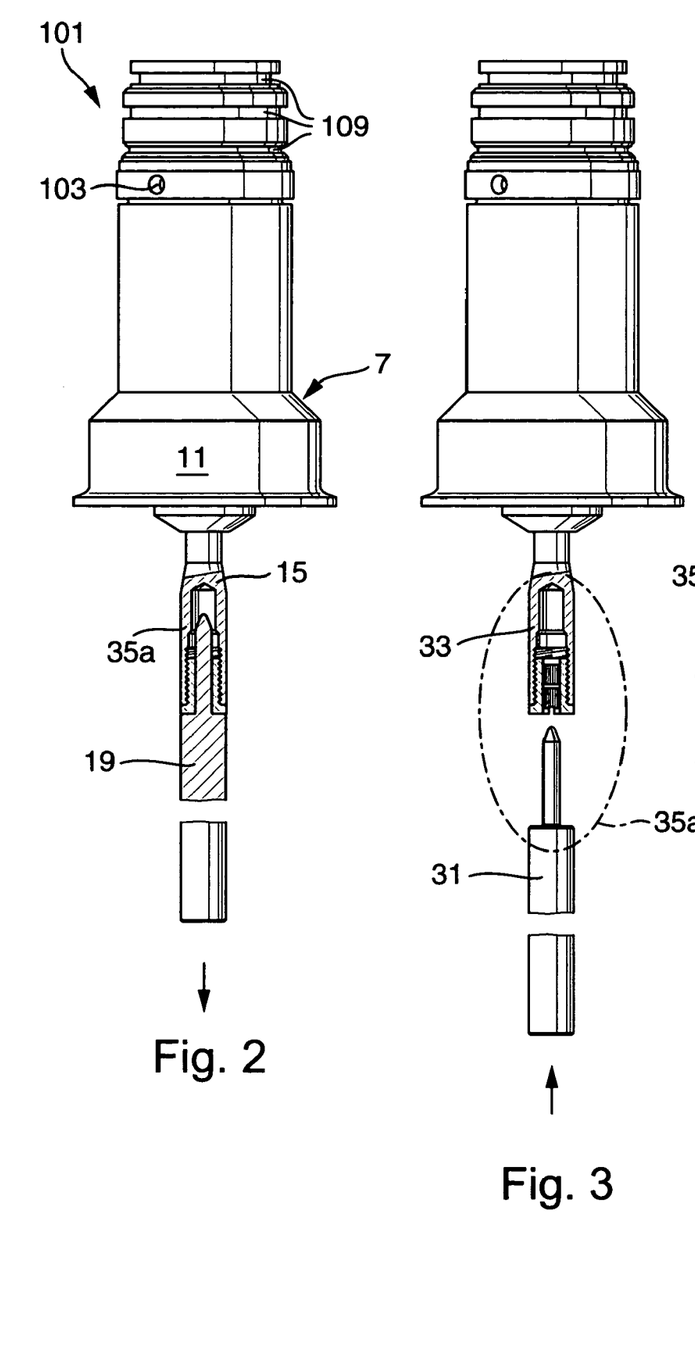
FIG. 2 shows a mounting element of FIG. 1, its probe segment and part of the probe extension shown in FIG. 1.
FIG. 3 shows the elements of FIG. 2 prior to connecting the probe extension to the probe segment.

Central part of the arrangement is a level sensor 5. The level sensor 5 comprises a mounting element 7 for mounting the level sensor 5 on an opening 9 of the container 3. FIG. 2 shows one example of the mounting element 7 in more detail. It comprises a process connector 11 for mounting the mounting element 7 on a mating counter connector 13 on the opening 9 of the container 3. Various types of generally standardized forms of process connectors are known in industry. A commonly used type in industries requiring stringent hygiene is known under the name tri-clamp. In the embodiment shown in FIG. 2 the process connector 11 is shaped according to the standards for tri-clamp connections. The corresponding mating counter connector 13 used in combination with this process connector 11 needs to be designed according to the same industry standard. Since corresponding counter connectors are commonly known standardized parts used in industry, the counter connector 13 is only shown schematically in FIG. 1. The invention is not limited to tri-clamp connectors. Other process connections known in industry can be used. The process connector can for example be a flange which is to be connected to a mating counter flange on the opening 9.

The mounting element 7 further comprises a conductive probe segment 15 extending from the mounting element 7 into the container 3. Inside the mounting element 7 an insulated feedthrough is foreseen, for electrically connecting the probe segment 15 to a sensor electronic 17.

Inside the container 3 a conductive probe extension 19 is foreseen, having a first end 21, which is permanently fixed to an inner wall 23 of the container 3. In a preferred embodiment, the probe extension 19 is welded onto the wall 23 of the container 23 and all surfaces 25 of the weld 27, exposed to the product 1 are polished. This has the advantage that the probe extension 19 can be easily cleaned and/or sterilized using for example the methods of CIP and SIP described above. A spray ball 29 can be permanently installed inside the container 3. All the surfaces of the weld 27 exposed to the product face upwards. No gaps or small enclosures exist which could not be cleaned or sterilized using the spray ball 29.

Figure 4:
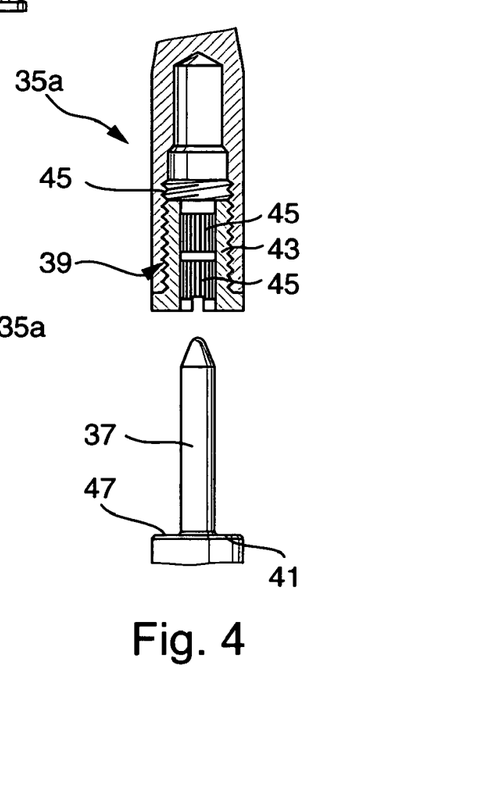
FIG. 4 shows the in-line connector of FIGS. 2 and 3 in detail.

The conductive probe extension 19 has a second end 31, which is detachably connectable to an end 33 of the conductive probe segment 15 extending into the container 3. To this extend a detachable connector 35 is foreseen. FIGS. 2, 3 and 4 show a first example of a detachable in-line connector 35a. In this embodiment, the in-line connector 35a is an in-line plug connector comprising a pin 37 and a mating socket 39. The pin 37 is for example an integral part of the probe extension 19. It is cylindrical and has a pointed tip 40 facing away from the first end 21 of the probe extension 19, which is permanently fixed to the wall 23 of the container 3. Its diameter is smaller than a diameter of the conductive probe extension 19, thus forming a shoulder 41 facing towards the socket 39. In the embodiment shown, the socket 39 comprises a hollow cylinder 43, which is screwed into a threaded bore 45 in the end 33 of the probe segment 15 facing towards the probe extension 19. Inside the hollow cylinder 43 clip holders 45 are foreseen, which securely embrace the pin 37 when it enters the socket 39. Preferably, the surface of the shoulder 41 is plated with a thin layer of gold 47 to ensure a good electrical contact and high cleanability.

Figure 5:
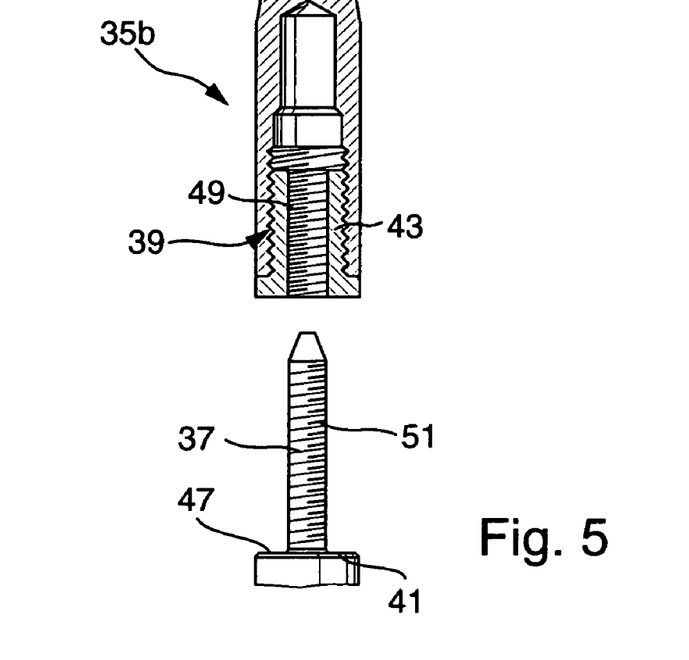
FIG. 5 shows an in-line connector having a threaded joint.

FIG. 5 shows a second example of a detachable in-line connector 35b. Because of the existing similarities with the previously described connector 35a only the remaining differences are described below. In the embodiment shown in FIG. 5, an inner thread 49 is foreseen inside the hollow cylinder 43 and an outer thread 51 is foreseen on the pin 37, thus allowing for the pin 37 to be screwed into the socket 39.

Figure 6:
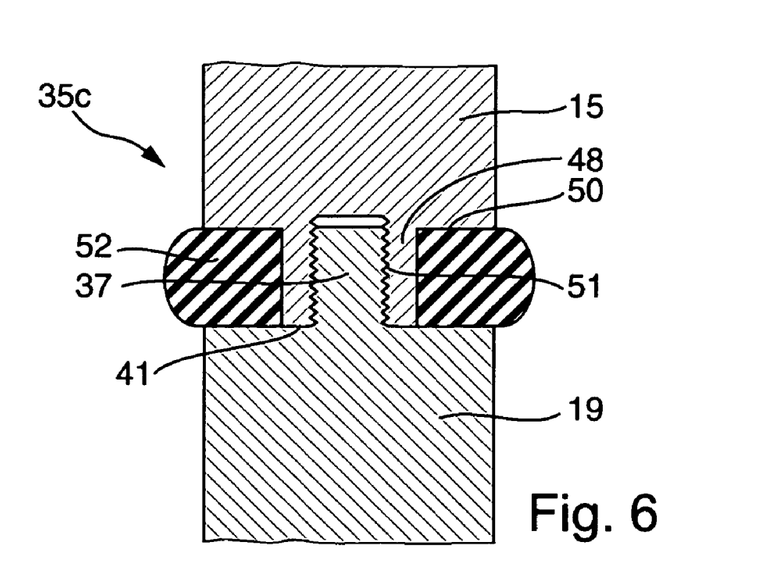
FIG. 6 shows a threaded joint between the probe segment and the probe extension.

FIG. 6 shows a third example of a detachable in-line connector 35c. Again, only the differences with respect to the previously described embodiments are described. In the embodiment shown in FIG. 7, the connector 35c comprises a threaded joint. Again, an outer thread 51 is foreseen on the pin 37 and the diameter of the pin 37 is smaller than a diameter of the conductive probe extension 19, thus forming a shoulder 41 facing towards the probe segment 15. The probe segment 15 comprises a hollow cylinder 48 extending from a front surface of the probe segment 15 towards the probe extension 19. Inside the hollow cylinder 48, an inner thread is foreseen, allowing for the pin 37 to be screwed into the hollow cylinder 48. An outer diameter of the hollow cylinder 48 is smaller than an outer diameter of the probe segment 15 thus forming a shoulder 50 facing towards the probe extension 19. A ring cylindrical gasket 52 is positioned between the two opposing shoulders 41 and 50. The hollow cylinder 48 is surrounded by the gasket 52 and defines a minimal distance between the probe segment 15 and the probe extension 19. This minimal distance ensures a defined compression force exerted on the gasket 52.

Figure 7:
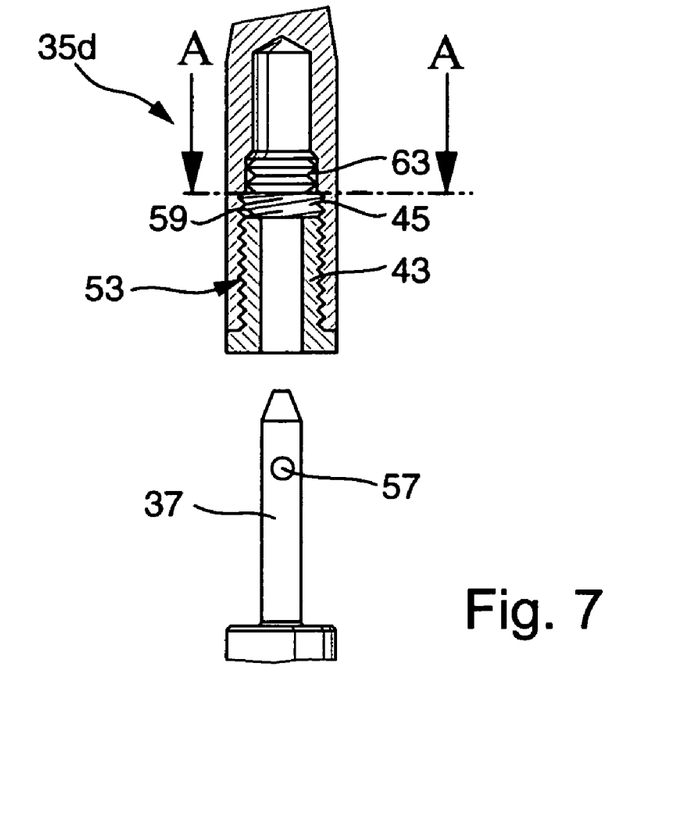
FIG. 7 shows a bayonet fitting.
Figure 8:
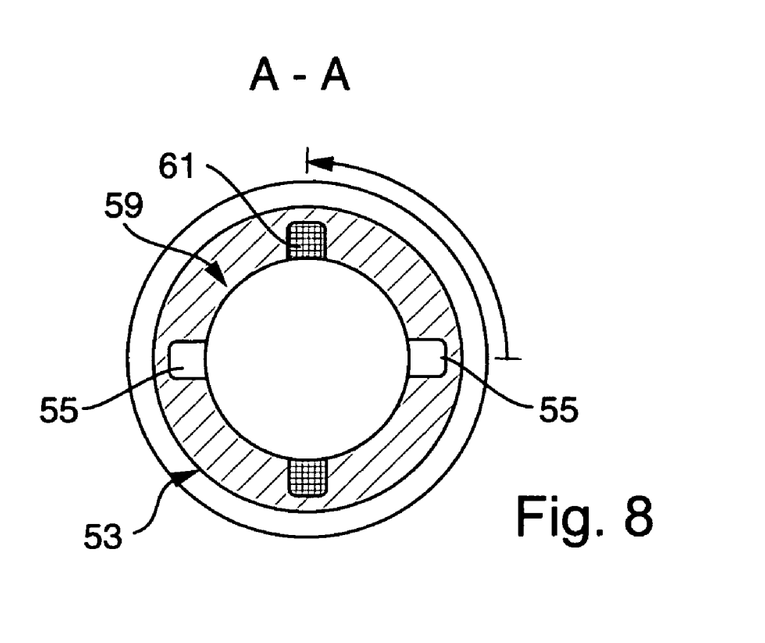
FIG. 8 shows a view of the cross-sectional area A of FIG. 7.

FIG. 7 shows a fourth example of a detachable in-line connector 35d. FIG. 8 shows a cross section of the in-line connector 35c marked A in FIG. 7. Here the connection is made via a bayonet fitting. Again, only the differences with respect to FIG. 4 are explained. The bayonet fitting comprises a hollow cylindrical socket 53 which is screwed into the threaded bore 45. On its inside, the socket 53 comprises two slots 55 extending parallel to the longitudinal axis of the socket 53 over its entire length. On opposing sides of the pin 37 two knoblike extensions 57 are foreseen. The pin 37 is inserted in the socket 53, such that the extensions 57 slide inside the slots 55 all the way through the socket 53. Then a turn, here a quarter turn indicated by the arrow in FIG. 8, lets the extensions 57 slide on a stern surface 59 of the socket 53 until they lock into place in recesses 61 foreseen on the stern surface 59 of the socket 53. Preferably a spring 63, for example made of ring shaped disks, is positioned inside the bore 45, such that the extensions 57 are inserted and held in place inside the recesses 61 by the spring.

Preferably the detachable connection 35, 35a, 35b, 35c, 35d between the probe segment 15 and the probe extension 19 is located above the product 1 in the container 3. To this extend, the connection 35 is located above the highest possible filling level the product 1 might reach inside the container 3. In the embodiment shown in FIG. 1, the connection 35 is located inside a tubular stud 63 surrounding the opening 9 and carrying the counter connector 13 for the process connector 11. When the connection 35, 35a, 35b, 35c, 35d does not get in contact with the product 1, it does not necessarily need to be cleaned. It can be sterilized in this position, using for example spray balls, designed to reach the area inside the stud 63.

Further, sensor electronics 17 are foreseen, comprising means for generating and sending short electromagnetic pulses S down the probe, means for reception of echoes E of the pulses S reflected at a surface of the product 1 and means for determining the level of the product 1 in the container 3, based on a time of flight t needed for a pulse S to travel down the probe and its echo E to return. The probe according to the invention comprises the conductive probe segment 15 and the conductive probe extension 19.

Figure 9:
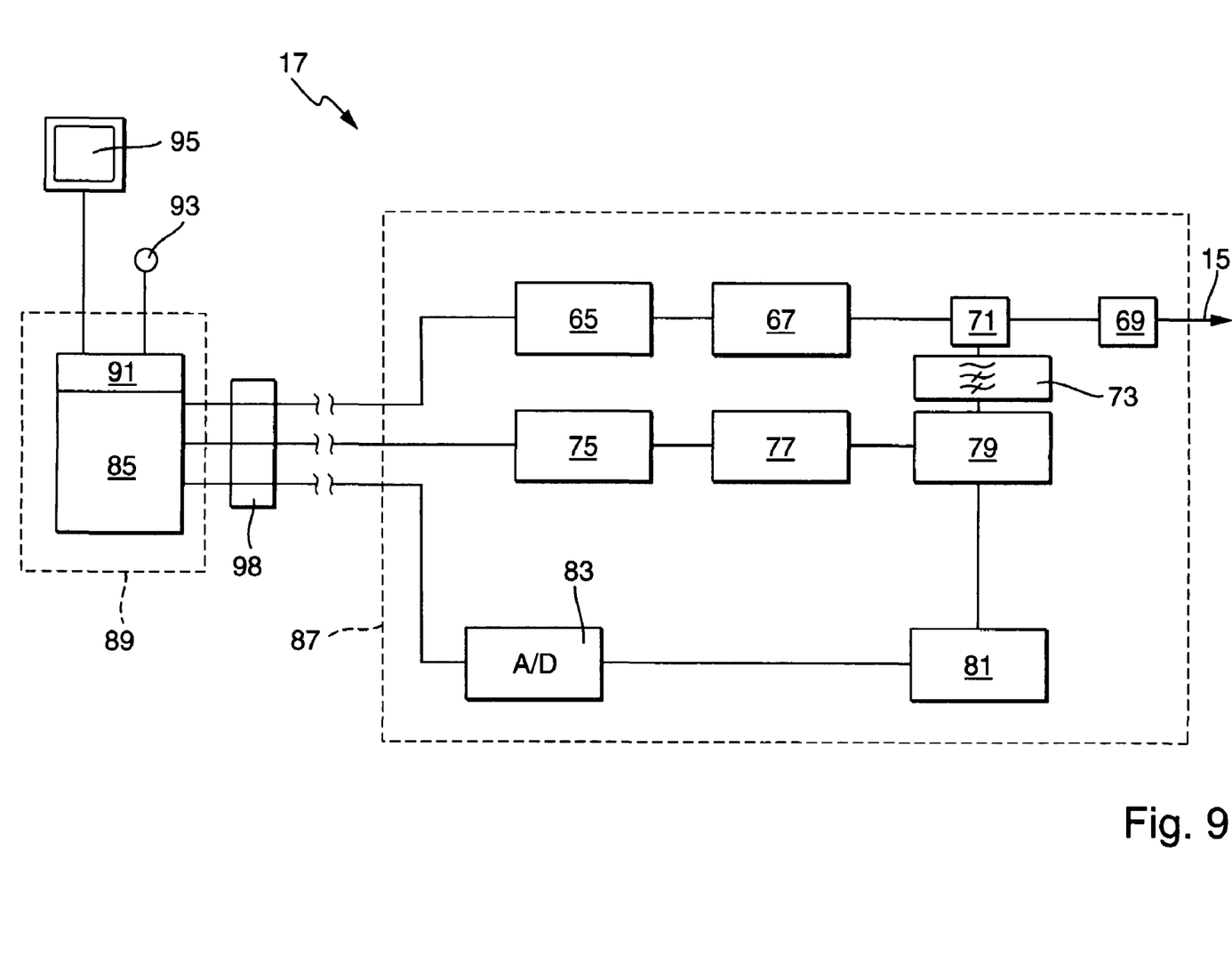
FIG. 9 shows a diagram of the sensor electronics.

FIG. 9 shows a schematic diagram of an example of the sensor electronics 17. The means for generating and sending short electromagnetic pulses down the probe comprise an internal clock 65 and a pulse generator 67. The internal clock 65 generates a pulse emission rate and supplies it to the pulse generator 67. Developments by the National Laboratory System now make it possible to generate fast, low power pulses, and time their return with very inexpensive circuits. See, for example, U.S. Pat. No. 5,345,471 and U.S. Pat. No. 5,361,070 assigned to The Regent of the University of California. The pulses generated by this new technology are broadband, and are not square wave pulses. In addition, the generated pulses have a very low power level. Such pulses are at a frequency of 100 MHz or higher and have an average power level of about 1 nano Watt or lower. Typical emission rates are for example several MHz.

The pulses S are supplied to the probe segment 15 via a coupling 69 located inside the mounting element 7. They propagate down the probe segment 15 and the probe extension 19, are reflected at the product surface and return to the coupling 69. From there they are supplied to the means for reception of the echo E comprising a directional coupler 71 and a high pass-filter 73.

The filtered signal is supplied to the means for determining the time of flight of the pulses. These means comprise a delay line 75. The delay 75 line is connected to the clock 65 and produces a sampling rate that is equal to the pulse emission rate produced by the clock 65 delayed by a variable delay time. The variable delay time varies for example according to a saw tooth function. The sampling rate is supplied to a sampling pulse generator 77, which in turn generates sampling pulses and provides them to a first input of a sample and hold circuit 79. Preferably sampling pulse generator 77 and pulse generator 67 are identical. The filtered signals obtained by the means for reception are supplied to a second input of the sample and hold circuit 79.

In operation short pulses S are sent periodically according to the pulse emission rate and their echo signals are supplied to the sample and hold circuit 79. The sample and hold circuit 79 superimposes a sampling pulse on every echo signal and the resulting signal is supplied to an amplifier 81. The amplified signal is digitalized by an analogue to digital converter 83 connected in series to the amplifier 81. A digital output of the analogue to digital converter 83 is supplied to a microprocessor 85.

The resulting signal is a measure for a correlation between the echo signal and the sampling pulse. Echo signals arrive periodically. They differ from the sampling pulses by the delay time, which increases according to the saw tooth function.

Assuming that consecutive echo signals are nearly identical, the sample and hold circuit 79 provides a stroboscopic recording of the echo signals. This assumption is generally correct, because the level inside the container essentially does not change between to consecutive pulses. The microprocessor 85 is linked to the clock 65 and the sampling rate generator 75. The microprocessor 85 regularly starts measurement cycles. During each measurement cycle, pulses S are generated and send periodically and their echoes E are received and corresponding echo signals are sampled as described above. A measurement cycle ends, when all delay times according to the saw tooth function were applied. The sampling values provided by the analogue to digital converter 83 and the corresponding delay times are recorded. The sampling values as a function of the delay time show a distinct maximum at a delay time that is equal to the time of flight needed for the pulse to travel down the probe segment 15 and the probe extension 19 and for its echo signal to return. This time of flight t is determined by the microprocessor 85.

The time of flight thus determined is proportional to the distance D between the coupling 69 and the surface of the product 1. Given a velocity v of propagation of the pulse along the probe and a distance H between the coupling 69 and a bottom of the container 3, the level L equals:

$$L = H - \tfrac{1}{2}(v\,t).$$

Preferably, the sensor electronic 17 is divided into a primary sensor electronic 87 comprising the means for generating and sending short electromagnetic pulses S down the probe and the means for reception of echoes E of the pulses S reflected at a surface of the product 1 and a secondary sensor electronic 89 comprising the means for determining the level of the product 1 in the container 3 and other components 91. In the embodiment shown, the microprocessor 85 forms the central part of the means for determining the level. The other components 91 are for example signal processing units for further processing the measurement results obtained by the microprocessor 85, communication means, for example open fieldbus communication means, such as bus powered HART, Profibus, Foundation Fieldbus or Power over Ethernet (PoE) TCP/IP for providing measurement and measurement related information via a communication interface 93 or means for providing an output signal to a display 95.

The level measurement arrangement comprises a housing 97 and means 99 for detachably mounting the housing 97 on the on the mounting element 7 outside the container 3. The primary sensor electronic 87 is located inside the mounting element 7 in close proximity to the probe. This has the advantage of short signal run times and enhanced signal-to-noise ratios. The secondary sensor electronic 89 is placed further apart from the process inside the housing 97. Preferably all parts of the sensor electronic 17 not able to withstand high temperatures are integrated in the secondary sensor electronic 89.

Means 98 for detachably connecting the primary sensor electronic 87, located inside the mounting element 7, to the secondary sensor electronic 89, located inside the housing 97, are foreseen. These means 98 are for example sealed plug connectors.

Various means 99 for detachably mounting the housing 97 can be foreseen. In the embodiment shown in FIGS. 2 and 10 the means comprise a tubular extension 101 on the mounting element 7 having threaded bores 103. The housing 97 comprises a tubular stud 105 having an inner diameter equal to an outer diameter of the tubular extension 101. The housing 97 is detachably mounted by pushing the tubular stud 105 over the tubular extension 101. It is held in place by setscrews, which can be screwed through threaded bores 107 in the stud 105 into the threaded bores 103 on the mounting element 7.

Figure 10:
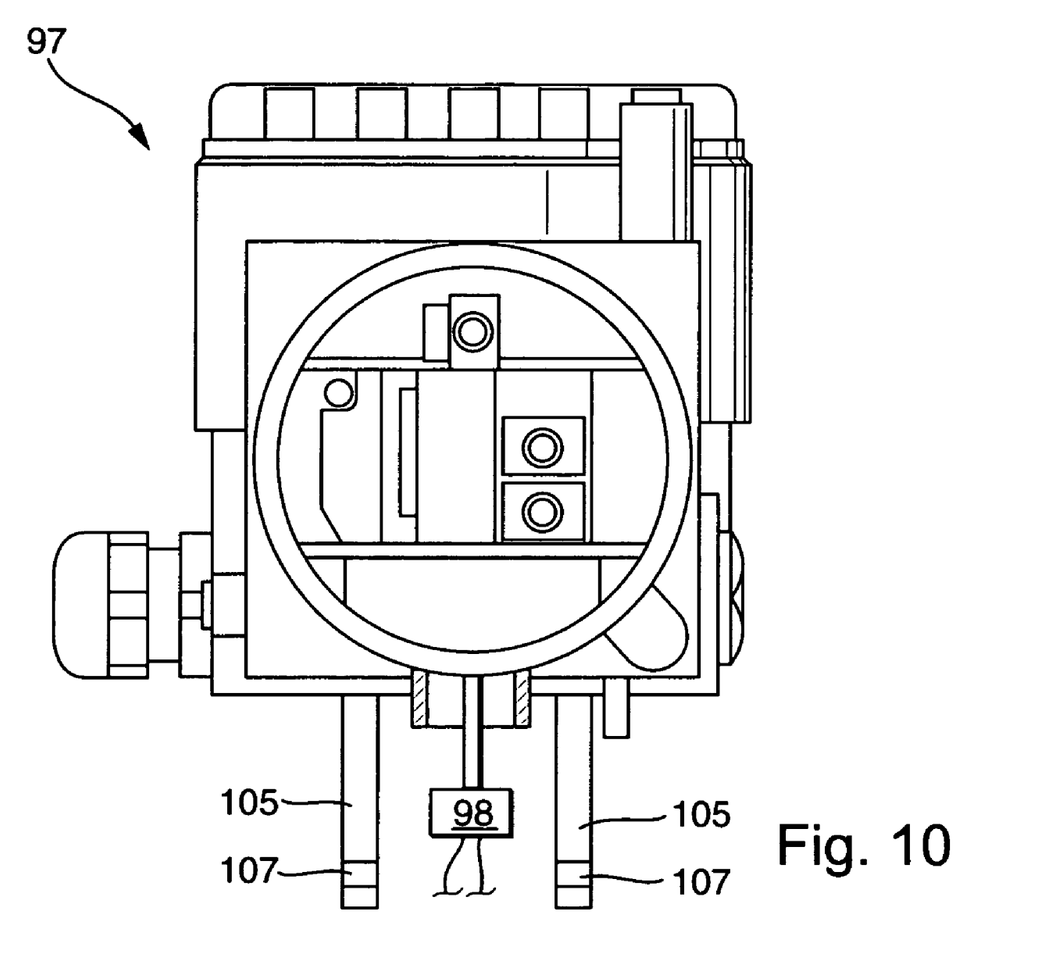
FIG. 10 shows the housing of FIG. 1.

Preferably one or more seals or foreseen for sealing the gab between the stud 105 and the tubular extension 101. To this extend, the tubular extension 101 comprises annular grooves 109 serving as retainers for O-Rings or other types of seals.

Since the housing 97 is to be detachably mounted, it is possible to remove the housing 97 and the secondary electronics 89 therein from the measurement site, without breaking the seal of the container 3. The secondary electronics 89 can thus be maintenanced, serviced or replaced without opening the container 3.

Also it is possible, to clean and or sterilize the mounting element 7 including the probe segment 15 without exposing the housing 97 and the secondary sensor electronics 89 therein to the cleaning and/or sterilization process. In a preferred embodiment, the mounting element 7 is hermetically sealed. This can for example be achieved by filling it with a potting material, which will prevent any moisture from entering its inside. Inside the hermetically sealed mounting element 7 the primary sensor electronic 87 is very well protected. Preferably the primary sensor electronic 87 comprises only parts, that can withstand high temperatures of for example up to 150° C. This has the advantage, that the entire mounting element 7 can be placed in an autoclave. In the autoclave the mounting element 7 will be exposed to steam under pressure effecting sterilization prior to mounting the mounting element 7 on the container 3.

1 product
3 container
5 level sensor
7 mounting element
9 opening
11 process connector
13 counter connector
15 conductive probe segment
17 sensor electronic
19 conductive probe extension
21 $1^{st}$ end
23 wall
25 surfaces
27 weld
29 spray ball
31 $2^{nd}$ end
33 end of probe segment
35 in-line connector
37 pin
39 socket
40 tip
41 shoulder
43 hollow cylinder
45 clip holders
47 gold layer
48 hollow cylinder
49 inner thread
50 shoulder
51 outer thread
52 gasket
53 socket
55 slot
57 extension
59 stern surface
61 recess
63 stud
65 clock
67 pulse generator
69 coupling
71 directional coupler
73 high pass filter
75 delay line
77 sampling pulse generator
79 S&H circuit
81 amplifier
83 a/d converter
85 microprocessor
87 primary sensor electronic
89 secondary sensor electronic
91 components
93 communication interface
95 display
97 housing
99 means for detachably mounting the housing
101 tubular extension
103 threaded bores
105 stud
107 threaded bores
109 annular grooves

What is claimed is:

1. A level measurement arrangement for the measurement of a level of a product in a container, comprising:
a level sensor, having a mounting element, including a process connector, for mounting said mounting element on a mating counter connector on an opening of the container, and a conductive probe segment extending from said mounting element into the container;
a conductive probe extension, having a first end, which is permanently fixed to an inner wall of the container, and having a second end, which during measurement is detachably connected to an end of said conductive probe segment extending into the container; and
sensor electronics, wherein:
said sensor electronics comprises: means for generating and sending short electromagnetic pulses down said conductive probe segment and said conductive probe extension; means for reception of echoes of the pulses reflected at a surface of the product, and means for determining the level of the product in the container, based on a time of flight needed for a pulse to travel down said conductive probe segment and said conductive probe extension, together with the time for the reflected pulse to travel to said means for reception of said echoes.

2. The level measurement arrangement according to claim 1, wherein:
said sensor electronic is divided into a primary sensor electronics comprising said means for generating and sending short electromagnetic pulses down said conductive probe segment and said conductive probe extension, and said means for reception of the echoes of the pulses reflected at a surface of the product and a secondary sensor electronics comprising said means for determining the level of the product in the container.

3. The level measurement arrangement according to claim 2, wherein:
said primary sensor electronics is located inside said mounting element; and
said secondary sensor electronics is located inside a housing.

4. The level measurement arrangement according to claim 3, further comprising:
means for detachably mounting said housing on said mounting element outside the container; and
means for detachably connecting said primary sensor electronics, located in said mounting element to said secondary sensor electronics, which is located inside said housing.

5. The level measurement arrangement according to claim 1, wherein: said conductive probe extension is welded onto the wall of the container.

6. The level measurement arrangement according to claim 5, wherein: all surfaces of the weld are polished.

7. The level measurement arrangement according to claim 1, wherein:
said process connector is a tri-clamp connector.

8. The level measurement arrangement according to claim 1, wherein:
a detachable connection between said conductive probe extension and said conductive probe segment comprises one of: a bayonet fitting, a threaded joint and an in-line plug connector.

9. The level measurement arrangement according to claim 8, wherein:
said detachable connection located above the product in the container.

* * * * *

UNITED STATES PATENT AND TRADEMARK OFFICE
CERTIFICATE OF CORRECTION

PATENT NO. : 7,592,946 B2
APPLICATION NO. : 11/339664
DATED : September 22, 2009
INVENTOR(S) : Klees et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 63 days.

Signed and Sealed this

Twenty-first Day of September, 2010

David J. Kappos
*Director of the United States Patent and Trademark Office*